United States Patent Office 3,454,104
Patented July 8, 1969

3,454,104
MUD MACHINE FOR RICE AND
SIMILAR CROPS
Bruno Fuchs, Rua 21 de Abril, 928 Ijui,
Rio Grande do Sul, Brazil
Filed Dec. 7, 1965, Ser. No. 512,163
Claims priority, application Brazil, Oct. 14, 1965,
174,037
Int. Cl. A01b 49/02, 15/14, 33/16
U.S. Cl. 172—176    1 Claim

ABSTRACT OF THE DISCLOSURE

Machine includes two pairs of disks converging rearwardly for cutting the earth, rearwardly converging shaping blades behind disks for pushing cut earth into a ridge, weighted roller behind blades for compacting earth ridge to form wall. Additional blades project inwardly from top of disks to direct cut earth inwardly. Regulating screw adjusts depth to which disks cut earth.

---

This invention relates to a mud machine for agriculture, particularly indicated for rice plantation. Fundamentally it deals with a hydraulic lifting machine of three points to be connected to a tractor, which piles up the earth and compresses it by means of a roller forming a mud-wall for directing water and the consequent irrigation of the plantation.

The operation of mechanical mud-wall formation by means of a machine connected to a tractor is divided into four phases:

(1) The cutting of the earth by the disks.
(2) The carrying of the earth.
(3) The piling up and shaping of the land.
(4) Compression of the earth to provide resistance to the mud-wall.

Figure 1:
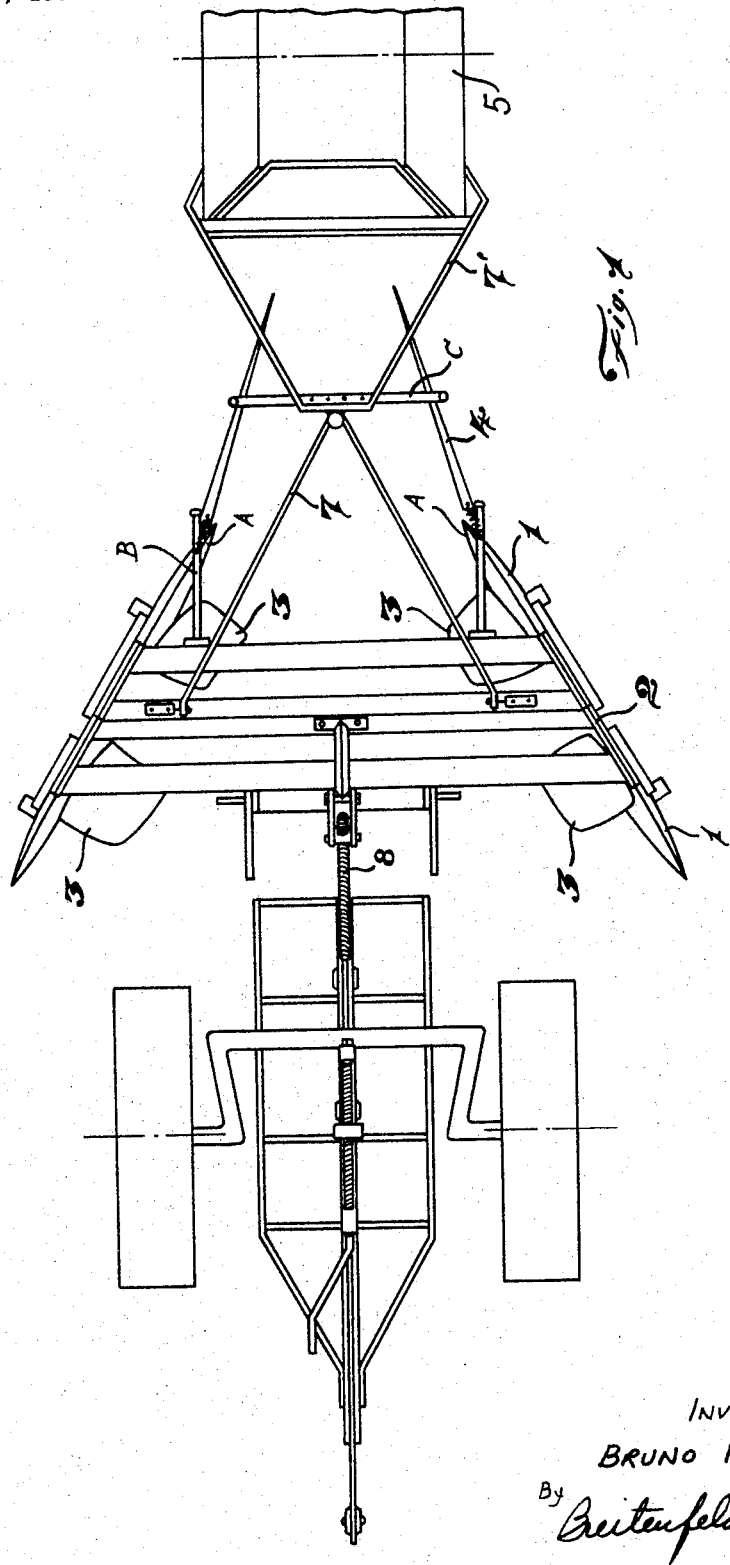
Figure 2:
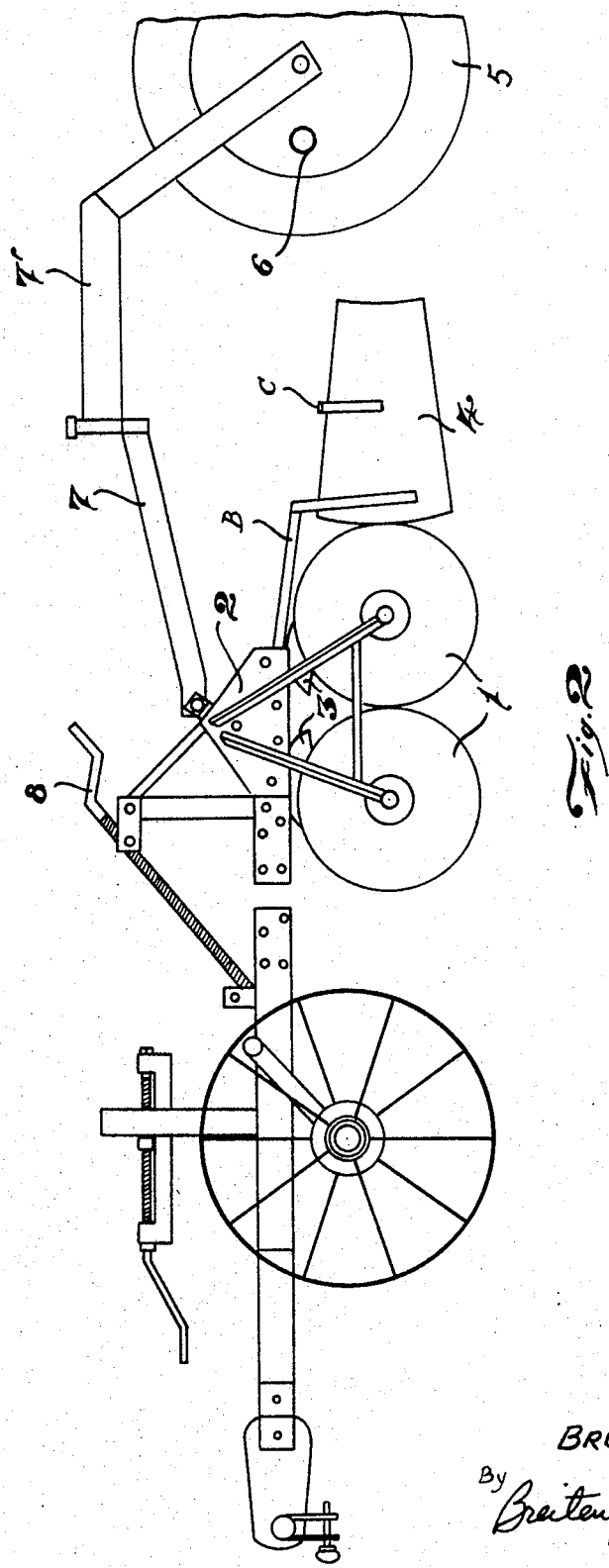
Figure 3:
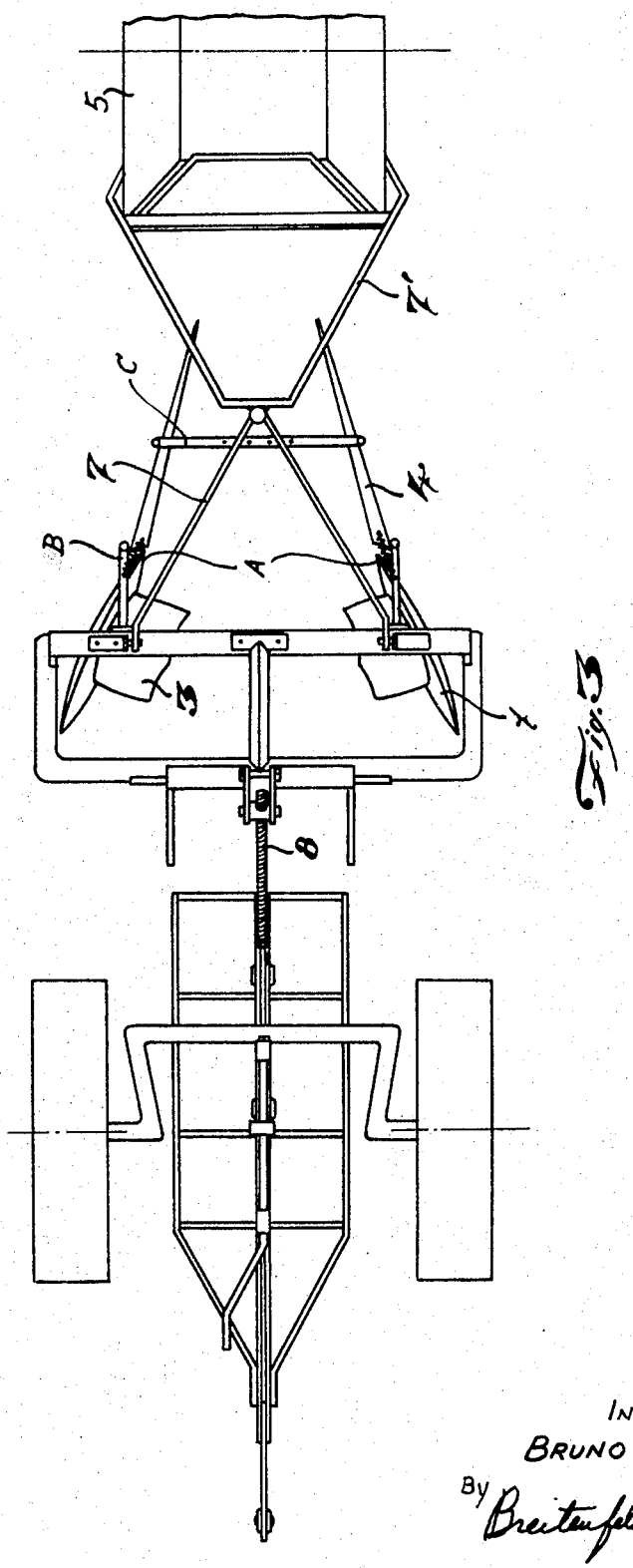
Figure 4:
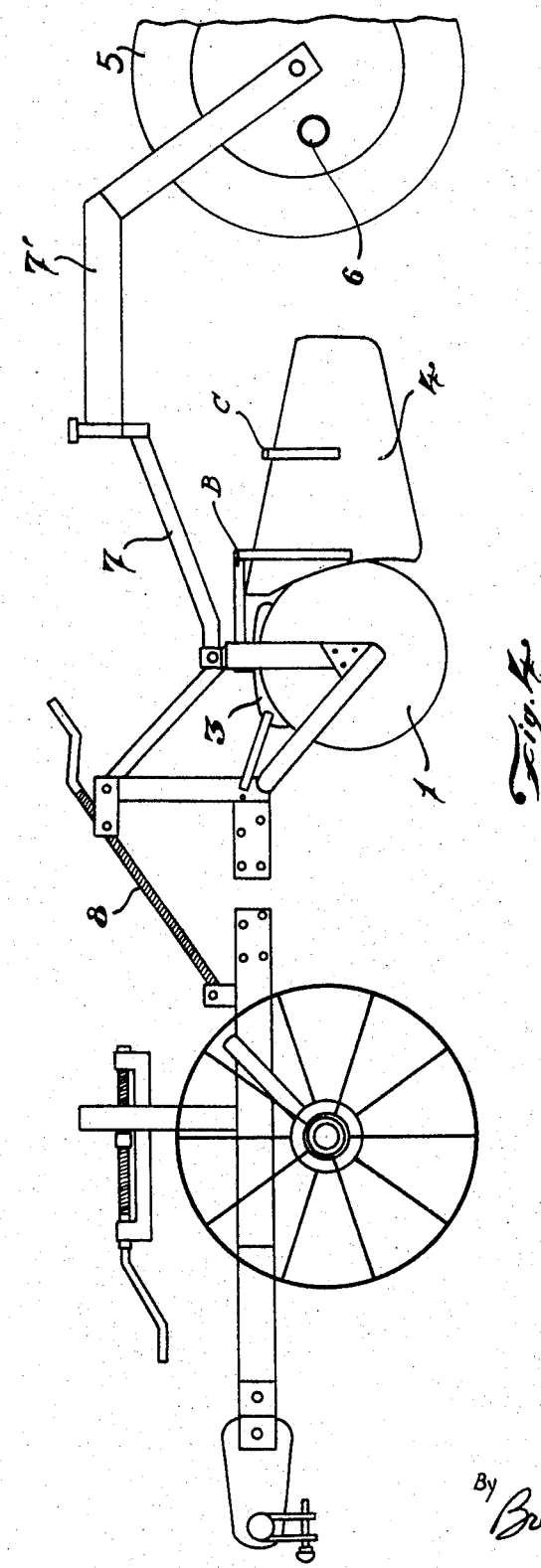

The attached drawings illustrate the new model, showing:

FIGS. 1 and 3—the machine in a blueprint.
FIGS. 2 and 4—the same, side view.

On these drawings the different parts mentioned hereinunder are identified by the same numbers cited herein.

The cut in the land is effected by four disks 1 having a diameter of 28 or 30 inches, which are fixed onto their supports 2 and arranged obliquely, two by two, the regulation of the depth being effected by the lever screw 8.

The carrying of the earth is obtained on the first plane by four blades 3, erected on the respective disks for the purpose of taking the earth to the centre of the mudpack. These carrying blades, curved in shape and slightly narrowed, prevent the earth from obstructing the disks.

The piling up and shaping of the land is effected by blades 4, mounted behind the disks. These blades are movable, for the purpose of permitting the making of the mudwalls on the curves, and they are manipulated automatically by the fixing bars B and by the spring parts A which cause the blades to return to their primitive position after their mobile use at the curves. The desired opening for the blades can be regulated, by means of the regulating bar C. The action of the blades is complementary to that of the disks in the sense of taking the earth to the centre, where the operation is completed, providing the shapes required for the formation of the mudwall. The composition of the disk of the plough 1 with conducting blades 3 and mounting and turning blades 4 gave birth to a new tool in the movement of earth for the formation of mudwalls or terraces, which makes possible, for the first time, to carry out this task in a practical manner, using small traction power.

The compressor roller 5 presses the earth in a trapezoidal form (mudwall). This is ballasted by water or sand, which is introduced through the large lid 6. The compressor roller is towed by means of a fluctuating articulation, composed of two parts 7 and 7' intended respectively for movements in vertical and horizontal planes.

The "mud machine" for the cultivation of rice and similar crops may also be manufactured with only two disks, which makes it lighter, not changing, however, its work. Fundamentally, it is the same machine, with the same characteristics, equipped, however, with only two disks, consequently in its structural plane slightly different from that described.

What is claimed is:
1. A machine for forming mud walls, comprising a frame adapted to be connected to a tractor, a pair of disks non-rotatably carried by said frame at each side of the latter for cutting the earth to be used in forming the wall, the disks of each pair being located in substantially the same plane and in substantially edge-to-edge relation, said pairs of disks converging toward the rear of said frame, a carrying blade fixed with respect to said frame and located near the top of each of said disks, said blade projecting inwardly with respect to its respective disk for directing the earth cut by said disks inwardly, a shaping blade carried by said frame behind each pair of disks for pushing the cut earth into a ridge, said blades converging toward the rear of said frame and the rear edges of said blades being spaced apart a distance less than the closest spacing between said pair of disks, and a weighted roller carried by said frame behind said blades for compacting the earth ridge into a wall, said roller having a smaller diameter at its center than at its edges.

References Cited

UNITED STATES PATENTS

| | | | |
|---|---|---|---|
| 142,753 | 9/1873 | Whittemore | 172—176 X |
| 151,104 | 5/1874 | Dietz | 172—176 X |
| 239,835 | 4/1881 | Parmley | 172—176 X |
| 779,143 | 1/1905 | Van Brunt. | |
| 888,103 | 5/1908 | Liebhart | 172—120 X |
| Re. 15,213 | 10/1921 | Parrish | 172—574 X |
| 2,034,579 | 3/1936 | Hurtig | 172—512 X |
| 2,713,297 | 7/1955 | Tsuchiya | 172—455 |
| 2,729,157 | 1/1956 | Webb | 172—176 X |
| 3,014,541 | 12/1961 | Oehler et al. | 172—455 X |

ANTONIO F. GUIDA, Primary Examiner.
ALAN E. KOPECKI, Assistant Examiner.

U.S. Cl. X.R.
172—776